April 29, 1958     G. W. KESSLER     2,832,944
STABILIZED MOUNTING FOR UNDERWATER SOUND APPARATUS
Filed Oct. 1, 1945     3 Sheets-Sheet 1
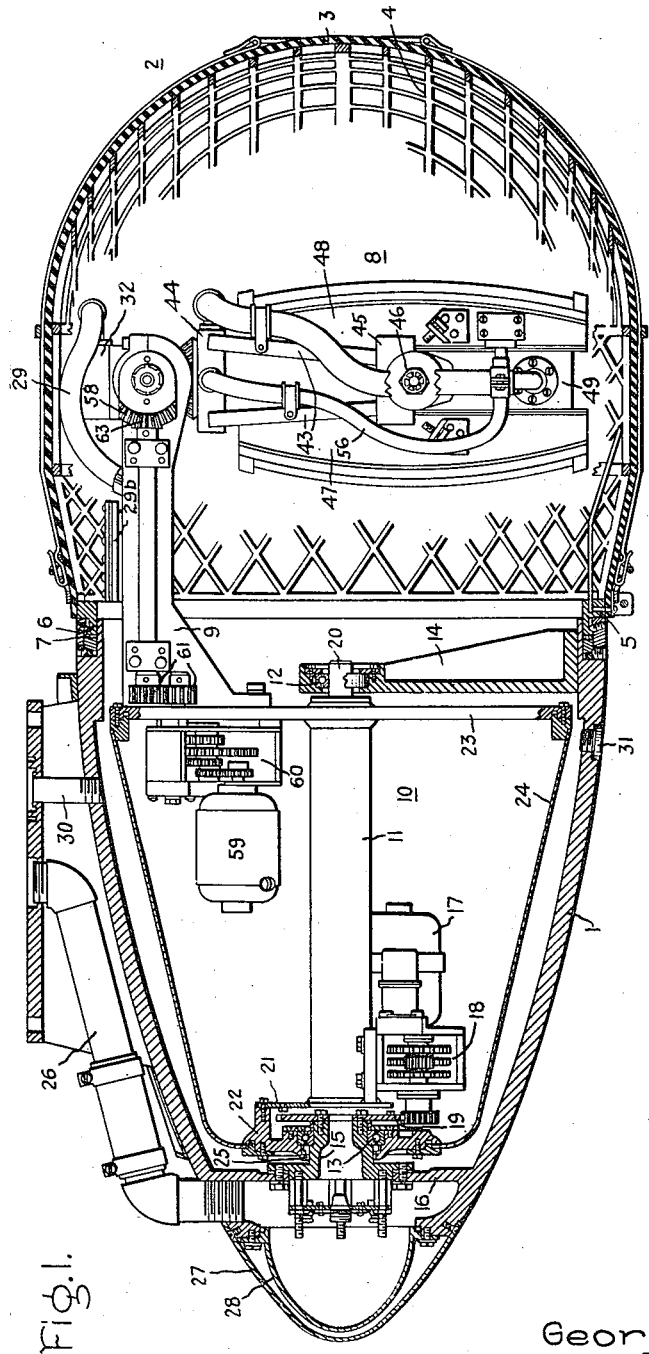
Inventor:
George W. Kessler,
by Merton D. Morse
His Attorney April 29, 1958  G. W. KESSLER  2,832,944
STABILIZED MOUNTING FOR UNDERWATER SOUND APPARATUS
Filed Oct. 1, 1945  3 Sheets-Sheet 2
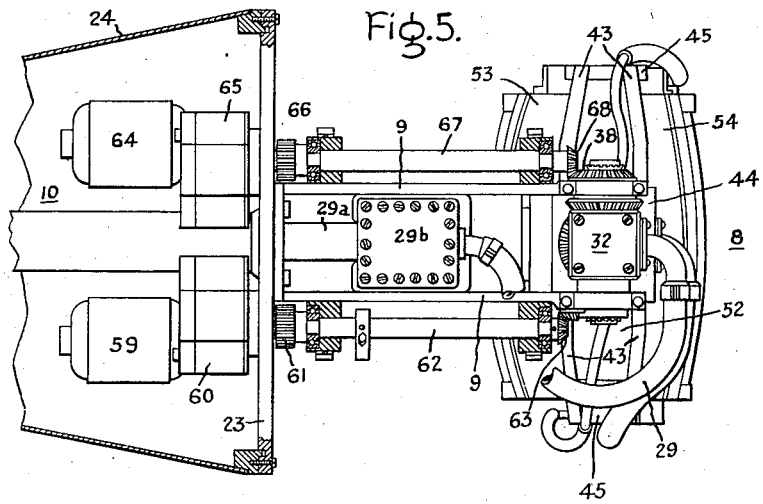
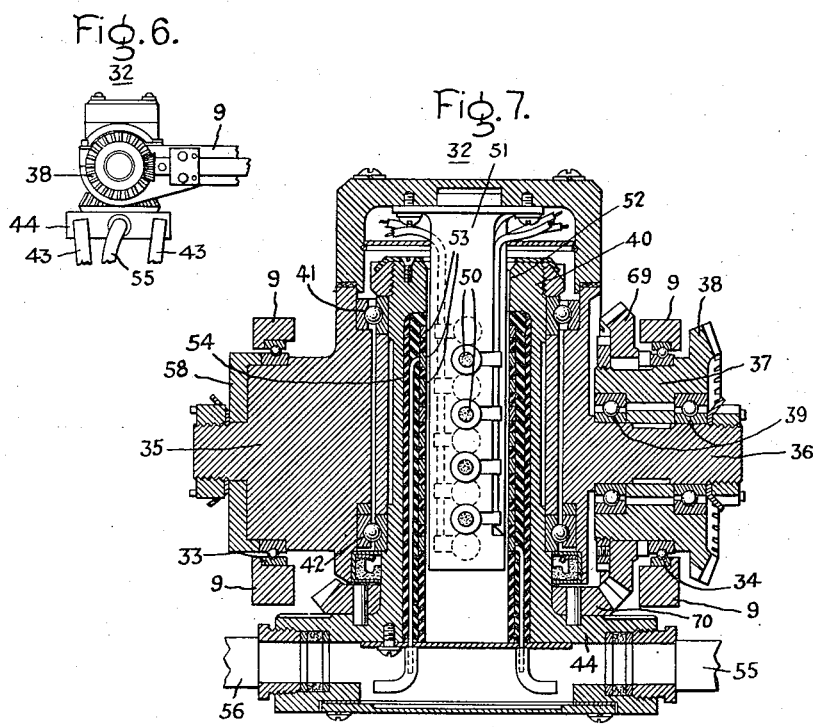
Inventor:
George W. Kessler,
by Merton D. Morse
His Attorney.

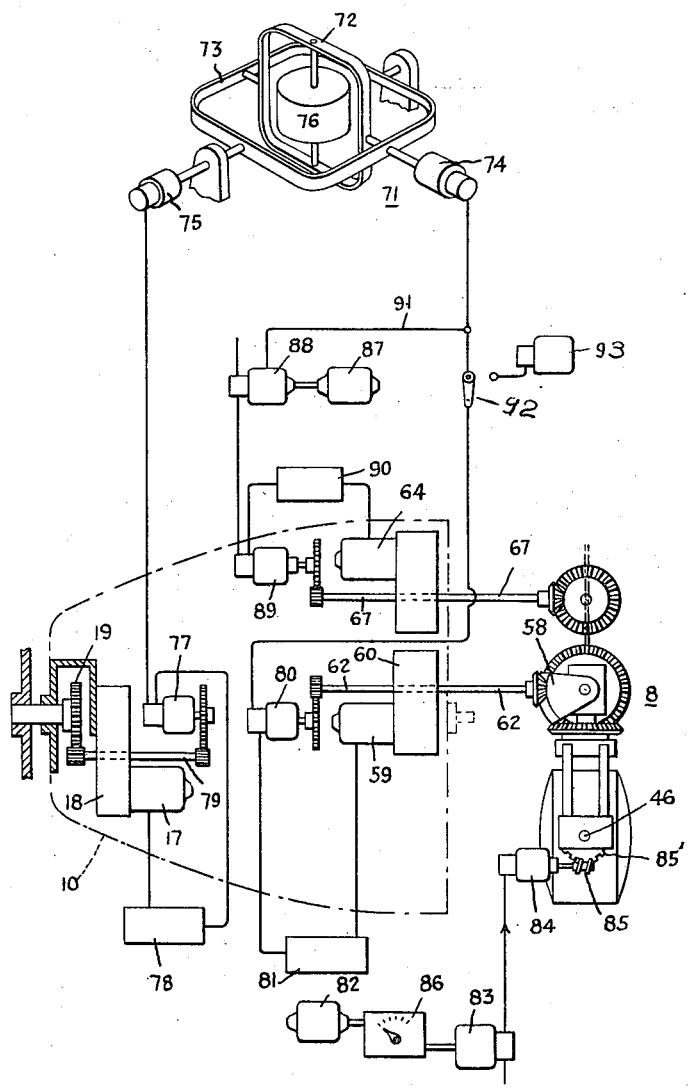

United States Patent Office 2,832,944
Patented Apr. 29, 1958

2,832,944

STABILIZED MOUNTING FOR UNDERWATER SOUND APPARATUS

George W. Kessler, Schenectady, N. Y., assignor to General Electric Company, a corporation of New York Application October 1, 1945, Serial No. 619,643

6 Claims. (Cl. 340—8)

This invention relates to sound apparatus for locating objects under water and particularly to the mounting and stabilizing of rotatable transducers for such apparatus.

Apparatus employing supersonic wave energy under water may be arranged to investigate an area of the ocean floor or a particular underwater area around a vessel. An apparatus for this purpose is described and claimed in a copending application Serial No. 619,720 filed concurrently herewith in the name of Cramer W. La Pierre et al. and assigned to the same assignee as the present invention. This type of equipment employs electroacoustic transducers for transmitting the sound energy and for receiving echoes from objects in the field under investigation. These transducers must be stabilized so that they are not subject to angular motion because of the rolling and the pitching of the vessel on which the apparatus is mounted. Furthermore it is desirable to mount the transducers within closed housings having minimum resistance to movement of the water in the direction of movement of the vessel. It is desirable that the casings or housings in which the transducers are located be made as small as possible consistent with the size and range of movement of the transducers. Furthermore since the transducer assemblies are necessarily relatively heavy, it is essential that the stabilizing mechanism be rugged and that there be minimum backlash or play in the driving mechanism regardless of the relatively high moments of inertia of the transducer assemblies. Accordingly it is an object of this invention to provide an equipment for transmitting or receiving sound under water including an improved arrangement for mounting the transducer for receiving or transmitting sound energy.

It is another object of the invention to provide a mounting for stabilizing an underwater electroacoustic transducer or the like which shall afford minimum obstruction to the transfer of sound energy to or from the equipment.

It is another object of this invention to provide a mounting for electroacoustic transducers or the like for operation under water including an improved arrangement for maintaining the transducer stabilized in any of a plurality of positions.

The novel features which are believed to be characteristic of this invention are set forth with particularity in the appended claims. The invention itself, however both as to its organization and method of operation, together with further objects and advantages thereof, may best be understood by reference to the following description taken in connection with the accompanying drawings in which Fig. 1 is a sectional side elevation of an underwater housing for an electroacoustic transducer including a mounting embodying the invention; Figs. 2, 3 and 4 are diagrammatic views of the housing shown in Fig. 1 illustrating three angular positions thereof during pitching of a vessel; Fig. 5 is a plan view, partly in section, of a portion of the transducer mounting shown in Fig. 1; Fig. 6 is a view of a portion of the mounting on the opposite side of that shown in Fig. 1; Fig. 7 is an enlarged sectional view of the bearing and slip ring assembly for the transducer of Fig. 1; and Fig. 8 is a diagrammatic view of the stabilizing control for the apparatus of Fig. 1.

Briefly the stabilizing apparatus illustrated in the drawings comprises a waterproof housing of streamlined form adapted to be supported from a vessel under water. The stabilizing motor drives are included within the housing and the control cables may be connected through a suitable duct to equipment on the vessel. An electroacoustic transducer is mounted on an arm extending from a drum which is stabilized for roll and the transducer is pendulously mounted on an assembly hanging from the arm and controlled to provide stabilization about the pitch axis of the vessel. The transducer is rotated during operation, and the gearing for rotation and for pitch correction is a positive drive which minimizes lost motion and insures the required response to stabilizing movements of the control. The rotary motion is corrected for the pitch motion which is imparted to the rotary gears by the pendulous movement of the transducer assembly. The normal axis of the transducer may be either vertical or horizontal, adequate stabilization being effected in either position.

Referring now to the drawings, the apparatus illustrated in Fig. 1 comprises a streamlined or teardrop-shaped housing which is arranged to be mounted with its principal or longitudinal axis parallel to the axis of roll of the vessel to which it is to be attached. The housing includes a steel body portion 1 which is tapered toward the stern of the vessel on which the housing is mounted and a dome-shaped nose 2 at the forward end of the body portion. The nose 2 comprises a cover 3 constructed of a suitable rubber or similar material having sound transmitting characteristics substantially the same as those of water. The cover 3 is supported on a grid-like metal framework 4 the larger portion of which has been shown broken away on the far side of the drawing to avoid confusion of the drawing. The framework 4 and the cover 3 are secured on a ring 5 which has a tongue 6 fitting in a recess extending around the edge of the casing 1 and is sealed to the casing by a deformable gasket 7. The details of construction of this seal are described and claimed in a copending application Serial No. 619,644 filed concurrently herewith, now Patent No. 2,601,995, in the name of John Skopic and assigned to the same assignee as the present invention. An electroacoustic transducer assembly 8 is mounted within the nose portion 2 of the housing, it being suspended on a bracket 9 secured to the forward end of a casing or barrel 10 which is stabilized with respect to the roll of the ship so that the bracket 9 remains in a selected position regardless of the rolling of the ship. The barrel 10 comprises a shaft 11 mounted for rotation about the axis of roll, two bearings 12 and 13 being provided for this purpose. The bearing 12 is secured in a bracket 14 and the bearing 13 is mounted in a boss 15 secured to a partition or wall 16 at the rear of the casing.

The barrel or casing 10 is rotated about the boss 15 and in the bracket 14 by operation of a motor 17 mounted on the shaft 11 and connected through a train of gears 18 to a gear 19 rigidly secured to the boss 15. The shaft 11 is provided with a reduced portion 20 mounted in the bearing 12 and is rigidly mounted by means of a plate 21 and a flanged disk 22 on the bearing assembly 13. The barrel or casing 10 comprises a plate or disk 23 rigidly secured to the right end of the shaft 11 and a sheet metal housing or shell 24 secured to the plate 23 and to the disk 22 to provide a waterproof enclosure for the motor 17 and the other apparatus within the casing.

A suitable seal 25 is provided between the disk 22 and the boss 15 to prevent leakage of fluid through the bearing 13 into the casing. The necessary electrical connections, motor leads and the like are carried into the housing by means of a conduit 26 and then through suitable slip rings or flexible leads (not shown) into the casing. In order to secure access to the electrical connections in the rear of the housing 1, the housing is provided with a removable cover 27 and a removable dome-shaped sealing cover 28 within the cover 27. In order to minimize the likelihood of the leakage of fluid into the casing 10, dry air or some other suitable gas, such as nitrogen, under pressure is admitted to the casing 10 through the conduit 26. This air under pressure is also conducted from the casing 10 through a connection 29a to an electric terminal box 29b and from there through a flexible conduit 29 to the interior of the transducer assembly 8. The space within the housing around the casing 10 and the transducer assembly is filled with a suitable liquid, such as a solution of sodium chromate, which has sound transmitting characteristics similar to the water in which the apparatus is to be used and which solution will not corrode the mechanism within the housing. It will thus be apparent that the housing provides a stream-lining arrangement to minimize the resistance of the apparatus to water during motion of the vessel on which it is mounted and also prevents corrosion of the apparatus which might be caused, for example, by its immersion in sea water. The sodium chromate solution may be admitted to the casing from the vessel through a connection 30; and a drain plug 31 is provided at the bottom of the casing for use in removing the solution. The housing may be drained through the connection 30 by inverting the housing and then removing the plug 31 to admit air. General structural features of the apparatus as just described, including the arrangement of the casing 10 so that it constitutes a support stabilized against rolling movement of the ship are described and claimed in a copending application Serial No. 619,642, filed concurrently herewith in the name of Francis R. Ellenberger and assigned to the same assignee as the present invention.

By supporting the transducer assembly 8 on the bracket 9 the assembly is stabilized against the rolling movement of the ship. It is also necessary to stabilize the transducer assembly to prevent its displacement due to the pitching of the ship; in order to effect pitch stabilization with minimum interference while affording as wide as possible an angle for the transmission or reception of sound energy the transducer assembly has been mounted to swing as a pendulum on the bracket 9. The bracket extends forward from the edge of the casing 10 near the periphery of the plate 23 and leaves most of the interior of the dome 2 free for the swinging and rotation of the transducer. The entire dome portion 2 constitutes a sound transmitting window for the housing and sound signals may be received or transmitted therethrough without substantial attenuation. The transducer 8 as illustrated is the transmitting transducer for an underwater object locating apparatus. The method of mounting the transducer assembly, however, is identical for both the transmitting and receiving transducers, it being immaterial so far as the present invention is concerned whether the transducer is operated as a receiver or as a transmitter. The pendulous mounting of the transducer 8 makes it possible to swing the transducer with respect to its support and maintain a predetermined fixed position regardless of the position to which the housing is moved by pitching of the ship. For example, as illustrated in Figs. 2, 3 and 4 the axis of the transducer is maintained vertical in all of the three positions shown. In Fig. 2 the bow of the vessel is higher than the stern, in Fig. 3 the vessel is horizontal, and in Fig. 4 the bow is lower than the stern. It will be noted that in all three positions there is ample room for the pendulous movement of the transducer assembly with respect to the bracket 9 and its rotation within the nose 2 of the housing. The transducer assembly as shown in Figs. 1, 5, 6 and 7 comprises a head or bearing housing 32 mounted in ball bearing assemblies 33 and 34 so that the head may be rotated within the bracket 9 on an axis parallel to the axis of pitch of the vessel. The head includes a trunnion 35 mounted in the bearing 33 and a trunnion 36 mounted within the bearing 34 by means of a hub 37 of a bevel gear 38 which is mounted within the bearing and is rotatable on the trunnion 36 in a pair of ball bearing assemblies 39. A sleeve 40 is rotatably mounted in the housing 32 on upper and lower ball bearing assemblies 41 and 42, which also serve as thust bearings and carry the weight of the transducer unit which is suspended from the sleeve 40 by two pairs of arms 43 rigidly secured to a block 44 constituting an integral flange or base of the sleeve 40. The lower ends of each of the two pairs of arms are secured in connecting blocks 45. The transducer unit is mounted for rotation about a shaft 46 extending between the blocks 45 and rigidly secured thereto. The transducer unit comprises a transducer 47 and a transducer 48 secured in back to back relation and spaced apart by a casing 49 which provide a water-tight chamber between the transducers.

Electrical connections to the transducer unit which are carried to the transducer assembly in the flexible conduit 29 are connected to a plurality of brushes 50 mounted in a post or column 51 of insulating material secured to the top of the housing 32 and extending into a recess 52 in the sleeve 40. The brushes 50 are arranged to engage slip rings 53 in an insulated assembly 54 mounted within the sleeve 40 and rotatable about the post or column 51. The connections from the slip rings 53 are carried through flexible conduits 55 and 56 to the transducers 47 and 48, respectively. Additional electrical connections are led into the housing through a flexible conduit 57 connecting the chamber within the head 32 to the housing 49. In order to move the transducer assembly pendulously with respect to the bracket 9, a sector gear 58 is provided on the trunnion 35 and a motor 59 mounted within the casing 10 is arranged to drive the sector 58 through a gearing 60 within the housing, a pair of pinions 61 outside the housing and a shaft 62 geared to drive the sector 58 through a pinion 63. The shaft connection between the gear box 60 within the casing and the pair of gears outside passes through the plate 23 in a suitable fluid-tight shaft seal. The motor 59 is controlled in a manner to be described later to vary the position of the transducer as indicated in Figs. 2, 3 and 4 in accordance with the pitching of the vessel.

The transducers 47 and 48 have been illustrated as transmitting transducers only one of which is excited at a time and which are employed to transmit a wide beam of supersonic wave energy into the water surrounding the streamlined housing. In order to sweep the beam over the area under examination it is necessary to rotate the transducer assembly at a predetermined constant speed. When the transducer is arranged to receive or send signals at a high rate of speed and over a considerable area, it is essential that the rate of rotation of the transducer be uniform without variation such as might be caused by a binding of parts of the driving mechanism or by the twisting of a flexible shaft. For this reason it is desirable to employ a rigid gearing which may be constructed with little or no backlash and which is sufficiently rugged to rotate the transducer at a uniform speed regardless of changing loads due to the movement of the water or other liquid about the transducer assembly during rolling and pitching of the ship. This is accomplished by connecting the gear 38 to be driven by a motor 64 mounted within the casing 10 on the plate 23 and connected to the gear 38 through a reduction gearing 65, a pair of pinion gears 66 outside the casing, a shaft 67 and a bevel pinion 68. The rotary movement is transmitted by the gear 38 through its hub 37 to a bevel gear 69 keyed to the hub. The bevel gear 69 engages a bevel gear 70 rigidly secured to the block 44 about the axis of rotation of the sleeve 40. It will be apparent from a consideration of the construction just described that when the transducer assembly moves about the axis of the trunnions 35 and 36 the gear 70 must rotate because it is in engagement with the gear 69. Consequently unless a correction is provided the rate of rotation of the transducer unit about its vertical axis as shown in the drawings will be varied in accordance with the pitching of the ship. It is, therefore, necessary to vary the rate of rotation of the transducer by a correction for the pitching of the ship in order to maintain the rate of rotation constant regardless of the pitching.

The control equipment for stabilizing the transducer assembly and including the device for adding the pitch correction to the rotary driving mechanism is shown diagrammatically in Fig. 8 where the barrel or casing 10 has been indicated by a dotted outline, parts of the apparatus within the casing being shown within the outline. The power supply circuits have been omitted from the drawing to avoid further complications, the manner of applying power being well known in the art. The stabilizing equipment includes a gyroscope 71 arranged in a Cardan mounting in accordance with well-known practice. The mounting includes gimbal rings 72 and 73 which are connected to drive selsyn generators 74 and 75, respectively. The gyroscope is provided with a rotor 76 mounted in the ring 72 at right angles to the shaft of the selsyn 74. Pitching movements of the ship cause the ring 72 to rotate on its axis and drive the pitch actuated selsyn 74. In a similar manner rolling movement of the ship causes the ring 73 to rotate about its axis and drive the selsyn 75. A signal from the roll selsyn 75 is transmitted to a followup selsyn 77 which transmits a signal to a servo amplifier mechanism 78 which supplies power in accordance with the signal to the roll driving motor 17 which rotates the casing 10 about its axis. The movement of the casing is transmitted mechanically to the selsyn 77 through a shaft 79 and the movement of the casing 10 continues until the selsyns 75 and 77 are again in the same or synchronous position. The operation of the selsyns 75 and 77 and the motor 17 is such that the casing 10 is maintained stable regardless of the rolling of the ship, the adjustment being made substantially simultaneously with the indication of roll provided by the gyroscope. In a similar manner the selsyn 74, which takes a position in accordance with the pitching of the vessel, supplies a signal to a selysn 80 which is geared to the sector 58. Signals from the selsyn 80, due to a difference in position between the selsyn 80 and the selsyn 74, are supplied to a servo amplifying mechanism 81 which supplies power to the motor 59. It is therefore apparent that the pendulous movement of the transducer assembly 8 is made to follow the pitching movement of the ship so that the axis of the transducer is maintained in a fixed position regardless of pitching of the vessel. The declination of the transducers in the assembly may be changed by rotation of the shaft about the axis 46, this being accomplished by operation of a motor 82 which drives a selsyn 83 which in turn supplies signals to a selsyn 84 which is suciffiently large to drive the transducer assembly directly through a worm 85 and gear 85'. The motor 82 and selsyn 83 may be located aboard the vessel remote from the transducers and the declination of the transducers may be read directly on an indicator 86 geared between the motor 82 and the selsyn 83.

The motor 64 for rotating the transducer assembly is also actuated by a followup control including a driving motor 87, a selsyn 88 driven thereby, a followup selsyn 89 geared to the shaft 67, and a servo amplifying mechanism 90 for supplying power to the motor 64. The motor 87 is rotated at a predetermined constant speed and directly determines the rate of rotation of the transducer assembly. As was mentioned above, it is necessary to correct the speed of rotation of the transducer assembly for movements of the assembly produced by the pitch stabilizing adjustment since the gearing inherently rotates the transducer as well as correcting for pitch. In order to introduce the pitch correction necessary to overcome this error in the rate of rotation, the selsyn 88 is constructed as a differential selsyn which transmits to the selsyn 89 a signal dependent upon the position of the motor 87 and also upon signals supplied from the selsyn 74 through a connection 91. The selsyn 88 may thus be made to send a signal to the selsyn 89 which either adds or subtracts the pitch signal from the rotation signal produced by the motor 87. The determination of whether the pitch signals should be added or subtracted from the rotation signal depends upon the direction of rotation. With the correction added in the manner just described, the transducer rotates at the same speed as the motor 87 regardless of the pitching of the ship.

Under certain conditions of operation it may be desirable to rotate the casing 10 so that the bracket 9 moves through an angle of 90 degrees to a position such that the axis of movement of the head 32 on the trunnions 35 and 36 is vertical. When the transducer is in this position it is rotated in a vertical plane and may be employed to scan a strip of the ocean bottom directly below the vessel on which the equipment is mounted. In order to maintain the transducer stabilized in this position, it is only necessary to lock the sector gear 58 in its zero position so that the transducer cannot swing about the axis of the trunnions 35 and 36. The sector gear may be locked in position by operation of a switch 92 disconnecting the pitch selsyn 74 and connecting a locked rotor selsyn 93 to the control selsyn 89 of the motor 59. It will now be apparent that the axis of rotation of the transducer assembly 8 within the bearings 41 and 42 is parallel to the axis of pitch of the ship, and since the pitch signal is transmitted to the motor 64 through the selsyns 88 and 89 the rotary movement of the transducer about its axis is corrected for pitching of the ship so that the rotation is constant and the transducer is maintained stablized by the cooperation of the roll and pitch stabilization controls with the motor 59 blocked to prevent rotation. Should shifting of the position of the transducer because of yawing of the vessel be significant, the above described apparatus may be employed to effect this correction by supplying a yaw responsive signal to the selsyn 89.

The stabilizing equipment described above, and specifically the arrangement for mounting the transducer for pendulous movement, provides a rugged and effective mechanism for maintaining a transducer in a predetermined position regardless of pitching and rolling of the vessel on which it is mounted.

While the invention has been described in connection with a particular form of underwater object locating apparatus, other applications will readily be apparent to those skilled in the art. It is not, therefore, desired that the invention be limited to the specific construction illustrated and described, and it is intended by the appended claims to cover all modifications within the spirit and scope of the invention.

What I claim as new and desire to secure by Letters Patent of the United States, is:

1. A device for mounting a wave energy transducer on an object subject to rotary movement about two horizontal axes extending in directions at right angles to one another comprising a support arranged to be secured on the moving object, means for stabilizing said support against rotation about one of said axes, a bracket secured to and extending outwardly from said support, a hanger pendulously suspended from said bracket about an axis parallel to the other of said two axes, a wave energy transducer supported on said hanger, means supporting said hanger for rotation about an axis at right angles to and intersecting its supporting axis, means including a first bevel gear mounted for rotation about the pendulous supporting axis of said hanger and a second bevel gear secured to said hanger and mounted about the axis of rotation of said hanger in engagement with said first gear for rotating said hanger, means including a driving mechanism on said bracket for rotating said hanger about its supporting axis to maintain its axis of rotation vertical regardless of movements of said object about said other of said two horizontal axes, and means for imparting to said first bevel gear a component of the motion of said object about said other horizontal axis for preventing changes in the rate of rotation of said hanger due to the pendulous movement of said hanger about the axis of said first bevel gear.

2. A device for mounting a wave energy transducer on a vessel subject to roll and pitch comprising a support arranged to be mounted on the vessel, means for stabilizing said support to prevent movement thereof with the roll of the vessel, a bracket secured to and extending outwardly from said support, a hanger pendulously suspended from said bracket about an axis parallel to the axis of pitch of the vessel, a wave energy transducer supported on said hanger, means mounting said hanger for rotation about an axis at right angles to and intersecting its supporting axis, means including a first bevel gear mounted for rotation about said supporting axis and a second bevel gear in mesh with said first gear and secured to said hanger concentrically with the axis of rotation thereof for rotating said hanger, said gears having a one to one ratio, means including a driving mechanism on said bracket for effecting pendulous movement of said hanger to maintain the axis of rotation of said hanger vertical regardless of the pitching of said vessel, and means for imparting to said first bevel gear the same angular adjustment as that applied to said hanger by said last mentioned means and in a direction such that the rate of rotation of said hanger about its vertical axis is not affected by the pendulous movement thereof.

3. A device for mounting a wave energy transducer on a vessel subject to roll and pitch comprising a support arranged to be mounted on the vessel, means for stabilizing said support to prevent movement thereof with the roll of the vessel, a bracket secured to and extending outwardly from said support, a hanger pendulously suspended from said bracket about an axis parallel to the axis of pitch of the vessel, a wave energy transducer supported on said hanger, means mounting said hanger for rotation about an axis at right angles to and intersecting its supporting axis, means including a first bevel gear mounted for rotation about said supporting axis and a second bevel gear in mesh with said first gear and secured to said hanger concentrically with the axis of rotation thereof for rotating said hanger, said gears having a one to one ratio, means including a driving mechanism on said bracket for effecting pendulous movement of said hanger to maintain the axis of rotation of said hanger vertical regardless of the pitching of said vessel, means for imparting to said first bevel gear the same angular adjustment as that applied to said hanger by said last mentioned means and in a direction such that the rate of rotation of said hanger about its vertical axis is not affected by the pendulous movement thereof, means for locking said hanger in its position for zero pitch, means affording rotation of said bracket to a position with the axis of rotation of said hanger parallel to the axis of pitch of said vessel whereby when said hanger is locked in its zero pitch position the angular adjustment for pitch applied to said first bevel gear maintains the rate of rotation of said hanger constant regardless of the pitching of the vessel.

4. A device for mounting an apparatus in a stable position on an object subject to rotary movement about two horizontal axes extending in directions at right angles to one another comprising a support arranged to be secured on the object, means for stabilizing said support against rotation about one of said axes, an apparatus mounting secured on said support for movement about an axis parallel to the other of said two axes and for rotation about an axis at right angles to and intersecting said parallel axis, means including a first gear mounted for rotation about said parallel axis and a second gear secured to said mounting about the axis of rotation of said mounting in engagement with said first gear for rotating said mounting, means including a driving mechanism on said support for rotating said mounting about said parallel axis to maintain its axis of rotation vertical regardless of movement of the object about said other of said two horizontal axes, and means for imparting to said first gear a component of the motion of the object about said other horizontal axis for preventing changes in the rate of rotation of said mounting due to the movement of said mounting about the axis of said first gear.

5. A device for mounting an apparatus in a stable position on an object subject to rotary movement about two horizontal axes extending in directions at right angles to one another comprising a support arranged to be secured on the object, means for stabilizing said support against rotation about one of said axes, an apparatus mounting pendulously suspended from said support about an axis parallel to the other of said two axes, means supporting said mounting for rotation about an axis at right angles to and intersecting said parallel axis, means including a first gear mounted for rotation about said parallel axis and a second gear secured to said mounting about the axis of rotation of said mounting in engagement with said first gear for rotating said mounting, means including a driving mechanism on said support for rotating said mounting about said parallel axis to maintain its axis of rotation vertical regardless of movement of the object about said other of said two horizontal axes, and means for imparting to said first gear a component of the motion of the object about said other horizontal axis for preventing changes in the rate of rotation of said mounting due to the pendulous movement of said mounting about the axis of said first gear.

6. A device for mounting an apparatus in a stable position on a vessel or similar object subject to roll and pitch comprising a support arranged to be secured on the vessel, means for stabilizing said support to prevent movement thereof with the roll of the vessel, an apparatus mounting pendulously suspended from said vessel about an axis parallel to the axis of pitch of the vessel, means securing said mounting for rotation about an axis at right angles to and intersecting its supporting axis, means including a first gear mounted for rotation about said supporting axis and a second gear in mesh with said first gear and secured to said mounting concentrically with the axis of rotation thereof for rotating said mounting, means including a driving mechanism on said support for effecting pendulous movement of said mounting to maintain the axis of rotation of said mounting vertical regardless of the pitching of the vessel, means for imparting to said first gear the same angular adjustment as that applied to said mounting by said last mentioned means and in a direction such that the rate of rotation of said mounting about its vertical axis is not affected by the pendulous movement thereof, means for locking said mounting in its position for zero pitch, and means affording rotation of said support to a position with the axis of rotation of said mounting parallel to the axis of pitch of said vessel whereby when said mounting is locked in its zero pitch position the angular adjustment for pitch applied to said first gear maintains the rate of rotation of said mounting constant regardless of the pitching of the vessel.

References Cited in the file of this patent
UNITED STATES PATENTS 1,731,776  Henry _____ Oct. 15, 1929
2,019,497  Kuntze _____ Nov. 5, 1935